United States Patent
Abdo

[19]

[11] Patent Number: 6,105,300
[45] Date of Patent: Aug. 22, 2000

[54] ICE FISHING APPARATUS

[76] Inventor: Terry J. Abdo, 620 W. Third St., Mankato, Minn. 56001

[21] Appl. No.: 09/243,918

[22] Filed: Feb. 3, 1999

[51] Int. Cl.$^7$ ................................................. A01K 97/12
[52] U.S. Cl. .................................................. 43/17
[58] Field of Search ...................................... 43/17

[56] References Cited

U.S. PATENT DOCUMENTS

| | | | |
|---|---|---|---|
| 1,253,746 | 1/1918 | Teeling | 43/17 |
| 1,777,496 | 10/1930 | Killory | 43/17 |
| 2,786,294 | 3/1957 | Whitacre | 43/17 |
| 3,423,867 | 1/1969 | Bartletti | 43/17 |
| 3,660,923 | 5/1972 | Jonhson | 43/17 |
| 3,745,689 | 7/1973 | Williams | 43/17 |
| 3,813,891 | 6/1974 | Wootten . | |
| 3,984,935 | 10/1976 | Petersen | 43/17 |
| 4,310,983 | 1/1982 | Irvin | 43/17 |
| 4,571,876 | 2/1986 | LeClair | 43/17 |
| 4,616,437 | 10/1986 | Harvey | 43/17 |
| 4,662,099 | 5/1987 | Stewart . | |
| 4,685,240 | 8/1987 | Fralick | 43/17 |
| 4,739,747 | 4/1988 | Johnson . | |
| 4,945,668 | 8/1990 | Keller . | |
| 4,953,317 | 9/1990 | Ruchel . | |
| 5,020,263 | 6/1991 | Werner | 43/17 |
| 5,154,015 | 10/1992 | Pecard . | |
| 5,157,855 | 10/1992 | Schmidt et al. . | |
| 5,168,651 | 12/1992 | Wilson | 43/17 |
| 5,540,009 | 7/1996 | Sykes . | |
| 5,598,656 | 2/1997 | Strasser . | |

*Primary Examiner*—Kurt Rowan
*Attorney, Agent, or Firm*—Dale J. Ream

[57] ABSTRACT

An ice fishing apparatus for alerting a fisherman when a fish has been caught includes a housing having an open end for covering an ice fishing hole. A shaft extends through the housing about which a fishing line with hook is wound. The fishing line with hook is extended through the open end of the housing for catching a fish beneath the ice. The apparatus further includes a flag assembly having a flexible flag shaft which is attached to the housing. The flag shaft includes a flag at its upper end, the flag shaft having a first flexed position in which the flag extends in a generally upward direction and a second flexed position in which the flag is generally below the top of the housing. The apparatus includes a handle for unwinding and extending the fishing line into the fishing hole. The flag shaft is maintained in the flexed position by bearing against the handle until a fish is caught on the hook. A catch of a fish causes movement of the handle so as to allow the flag shaft to move to the unflexed position. The flag assembly further includes a light attached to the upper end of the flag shaft that is energized as the flag shaft is moved from the flexed position to the unflexed position.

3 Claims, 6 Drawing Sheets

ICE FISHING APPARATUS

BACKGROUND OF THE INVENTION

This invention relates generally to ice fishing equipment and, more particularly, to a tip-up ice fishing rig for inhibiting the freezing of an ice fishing hole that provides an illuminated signal when a fish has been hooked.

Ice fishing is a popular water sport in winter climates where bodies of water are frozen for prolonged periods of time. Typically, an auger is used to bore a hole in the ice through which a fishing line is extended for the purpose of catching a fish. Avid ice fishermen often bore several holes at various locations across the frozen body of water and set up ice fishing rigs, also called tip-ups, to fish the area beneath each hole. The main purpose of a tip-up ice fishing rig is to cover the hole to inhibit the freezing of the water within the hole. Premature freezing of an ice hole is particularly problematic for fishermen attempting to fish several holes at once or where the holes must be left unattended for prolonged periods of time, such as while the fisherman retreats from exposure to the elements of the winter weather.

Another problem experienced by fishermen attending to multiple ice holes is determining which ice fishing rigs have in fact hooked a fish without manually checking each rig. Although several rigs presented in the prior art utilize flags which spring up to a vertical position when a fish is hooked, these devices are not as effective where ice fishing rigs are spread out over a large portion of the body of water and where the ice rigs are being monitored during the early morning or dusk hours.

A further disadvantage of the ice fishing rigs presented in the prior art is that they are relatively complex in construction and expensive to manufacture. While some of the components of an ice fishing rig must in fact be manufactured and purchased, others can be adapted and assembled using parts and tools already owned by most fishermen.

Therefore, it is desirable to have a tip-up ice fishing rig that can inhibit the freezing of water within an ice hole. It is further desirable to have an ice fishing rig that can provide an illuminated signal when a fish has been hooked. It is also desirable to have an ice fishing rig that can be constructed in part with common components.

SUMMARY OF THE INVENTION

Accordingly, I have invented a tip-up ice fishing rig which utilizes a housing having an open end for covering an ice fishing hole so as to inhibit freezing of the water therein. A shaft extends through the housing and includes a spool or reel about which a fishing line may be wound. A hook is attached to a free end of the fishing line for catching a fish when extended into the fishing hole by rotating the shaft.

The fishing rig further includes a flag assembly having a flexible flag shaft having first and second ends. The first end of the flag shaft is releasably attachable to a desired position on the housing. A flag is attached to the second end of the flag shaft. The flag extends upwardly when the flag shaft is in a first unflexed position and is held below a top of the housing when the flag shaft is in a second flexed position.

The shaft includes a handle for rotating the shaft to unwind the fishing line and hook through the open housing end into the fishing hole. The flag shaft may be placed in the second flexed position such that the handle bears against the flag shaft to maintain the flag shaft in the flexed position. When a fish is caught, the handle rotates so as to allow the flag shaft to return to its normally upright unflexed position, thus alerting the fisherman that a fish is on the fishing line.

A switch housing is coupled to the first end of the flag shaft. The switch housing includes a battery, a power switch, and a toggle switch. A light is attached to the second end of the flag shaft and communicates with the toggle switch through a wire. Electrical current is selectively supplied to the toggle switch by a power switch. The closed toggle switch directs current to the light upon the flag shaft reaching the unflexed upright position. A spring surrounding the first end of the flag shaft urges the flexed flag shaft to its upright position to close the toggle switch for energizing the light.

It is therefore a general object of this invention to provide a tip-up ice fishing rig which can inhibit the freezing of water in an ice fishing hole.

Another object of this invention is to provide a tip-up ice fishing rig, as aforesaid, which is simple and economical to manufacture and assemble.

A further object of this invention is to provide a tip-up ice fishing rig, as aforesaid, having a signaling assembly which visually indicates if a fish has been caught.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
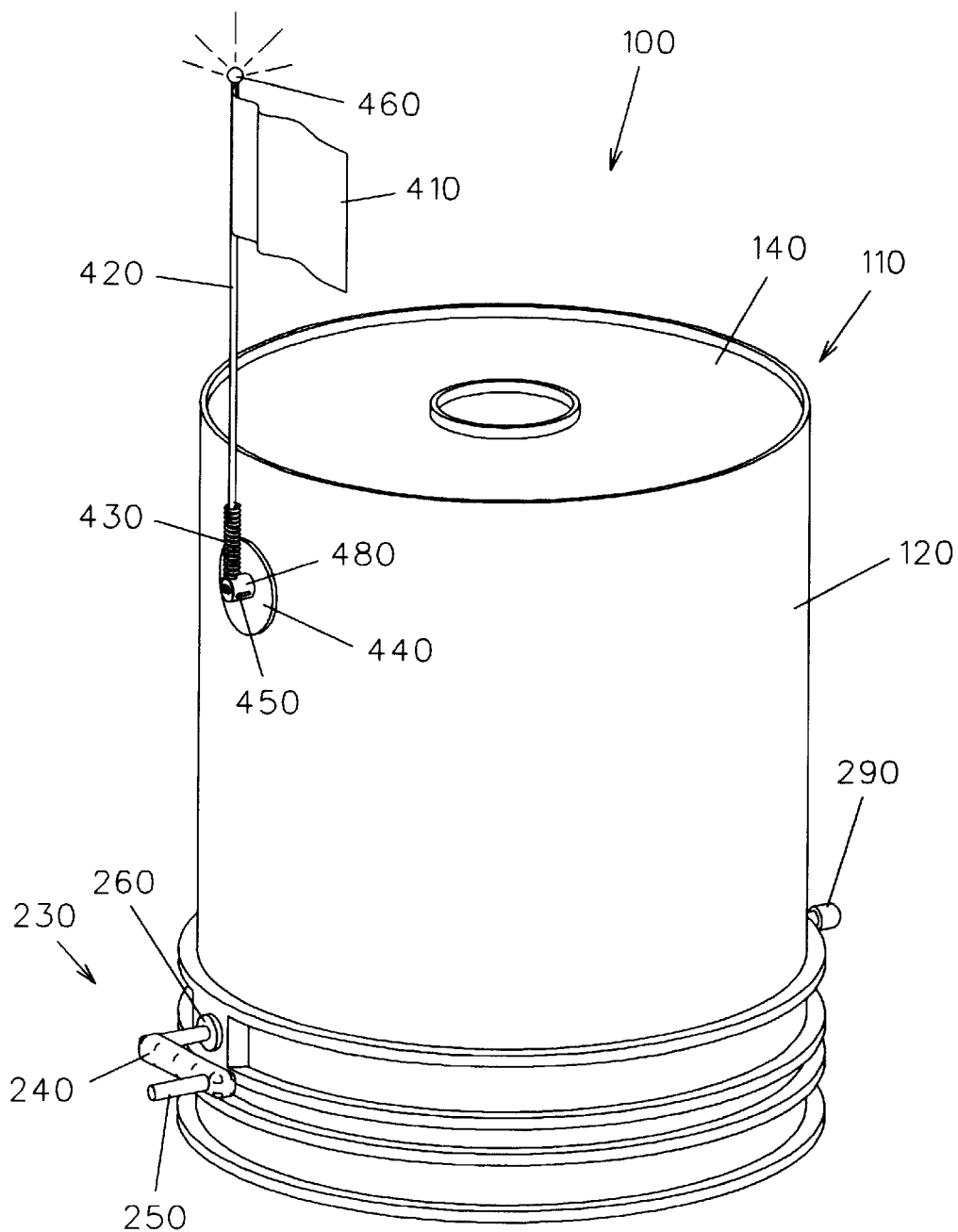
FIG. 1 is a perspective view of the tip-up ice fishing rig with the signaling assembly in an upright configuration.
Figure 2:
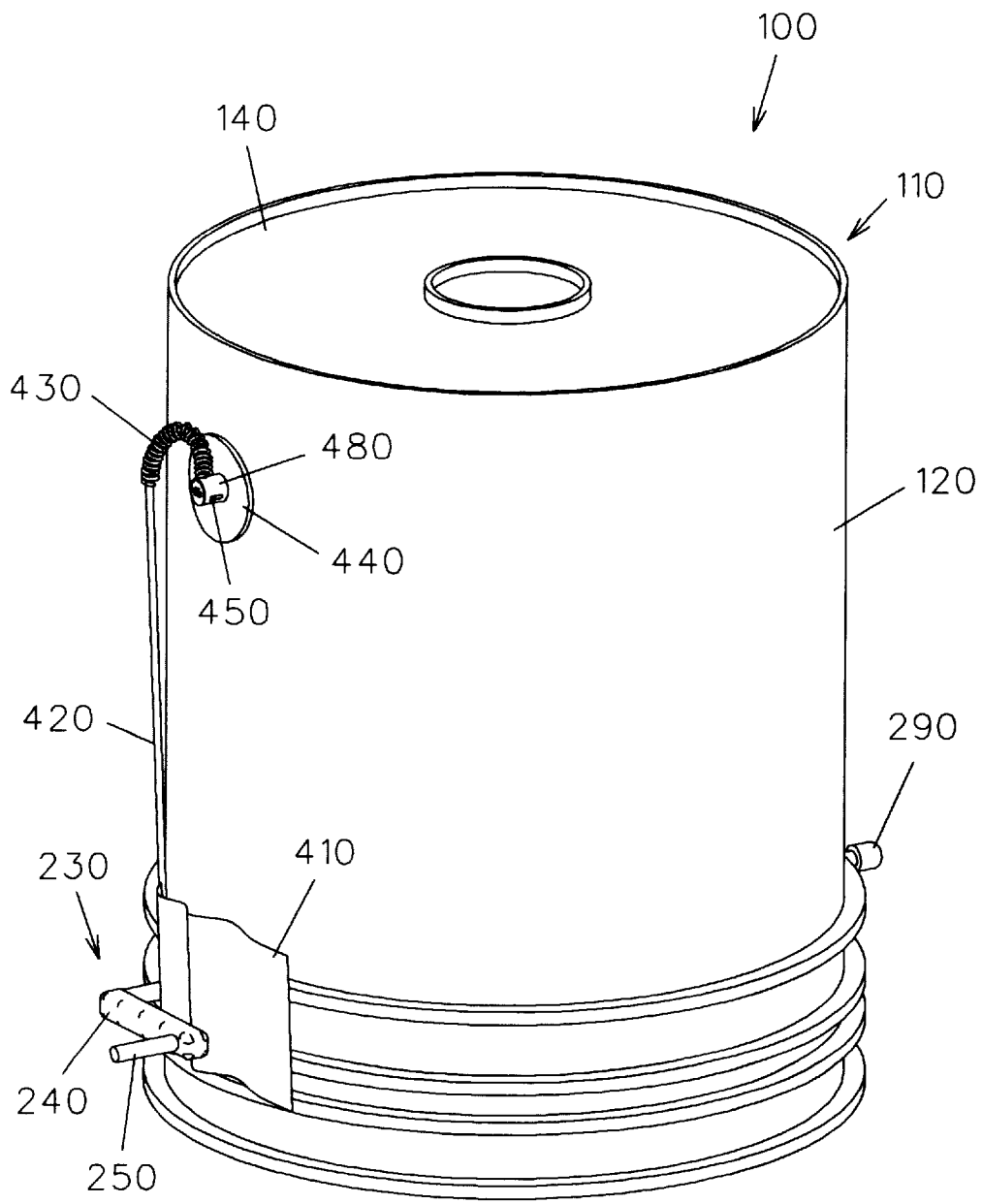
FIG. 2 is a perspective view of the tip-up ice fishing rig as in FIG. 1 with the signaling assembly in a cocked position.
Figure 3:
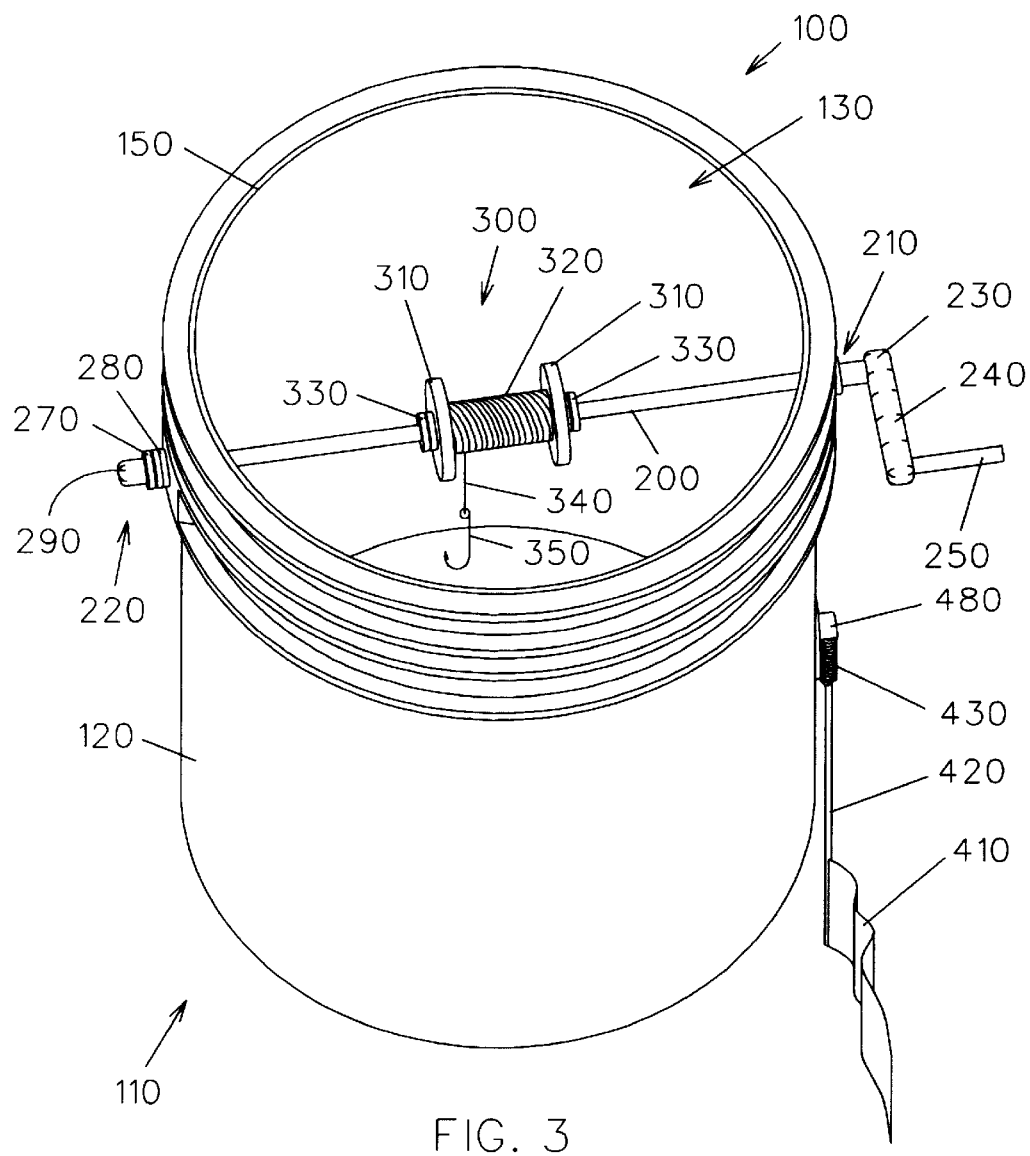
FIG. 3 is a perspective view through the open end of the ice fishing rig as in FIG. 1 which shows the spool assembly mounted to a shaft.

Turning more particularly to the drawings, FIGS. 1 through 3 show the now preferred embodiment of the tip-up ice fishing rig 100 configured to cover an ice fishing hole and inhibit freezing of the water within the hole. The ice fishing rig 100 comprises a cylindrical housing 110 having a tubular side wall 120 with opposed open 130 and closed 140 ends. Preferably, the housing 110 is a conventional five gallon bucket, although other variously sized pails or buckets would also be suitable. A layer of insulation 150 is attached to the interior surface of the side wall 120 for inhibiting elements such as wind and air from entering the housing 110 (FIG. 3).

Figure 4:
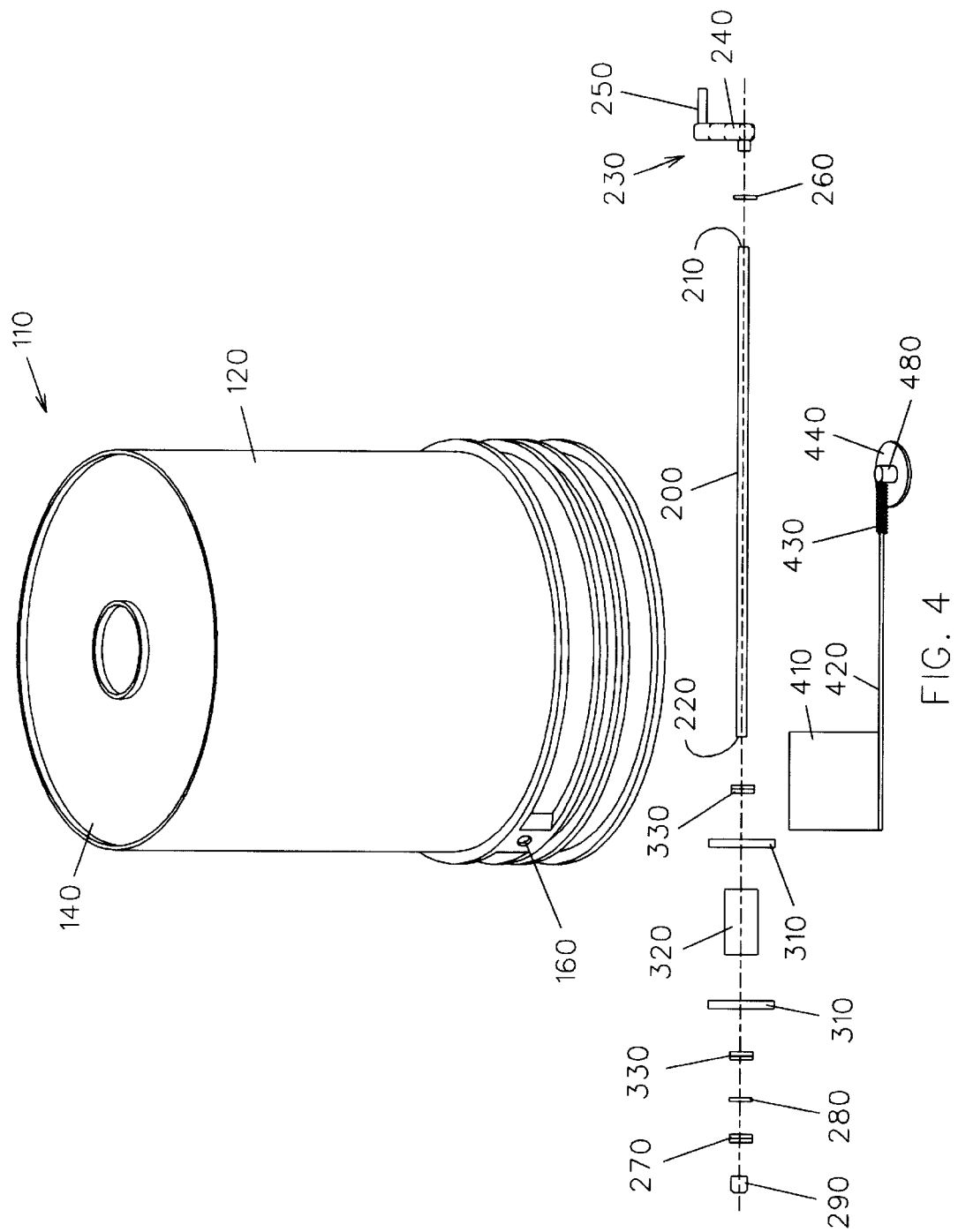
FIG. 4 is an exploded view of the ice fishing rig.

A pair of oppositely disposed circular apertures 160 extend through the side wall 120 (FIG. 4). The apertures 160 are presented upon removal of the handle of the housing 110 and may be drilled to present larger diameters if necessary to accommodate a tubular shaft 200. The tubular shaft 200 includes first 210 and second 220 ends extending through apertures 160 and is freely rotatable therein. An offset handle 230 is coupled to the first end 210 of the shaft 200. The handle 230 includes a first arm 240 normal to the shaft 200 and a second arm 250 outwardly extending from a free end of the first arm 240. A bushing 260 precludes inward lateral movement of the handle 230 and shaft 200.

A spool 300 is slidably mounted to the shaft 200 and is sandwiched by a pair of rubber stoppers 330 for holding the spool in a desired position thereon. The spool 300 comprises a pair of spaced apart wooden disks 310 with a cylindrical rubber spacer 320 sandwiched therebetween. Fishing line 340 is wound about the spacer 320 with a fish hook 350 coupled to a free end of the fishing line 340. It is understood that while the spool 300 shown in FIG. 4 comprises individual components, a spool 300 having a one-piece molded construction, such as a conventional fishing reel, would also be suitable. The spool 300 and rubber stoppers 330 fit tightly about the shaft 200 such that movement of the spool 300 by a hooked fish will cause the entire shaft 200 and handle 230 to rotate. Conversely, rotation of the handle 230 by a user rotates the spool 300 for extending or retracting the fishing line 340.

The second end 220 of the shaft 200 extends through a housing aperture 160 to a position adjacent the exterior surface of the side wall 120 (FIG. 3), a rubber stopper 270 and bushing 280 being slidably attached thereto. Thus, lateral movement of the shaft 200 is precluded. An end cap 290 is frictionally attached to the second end 220 of the shaft 200.

Figure 5:
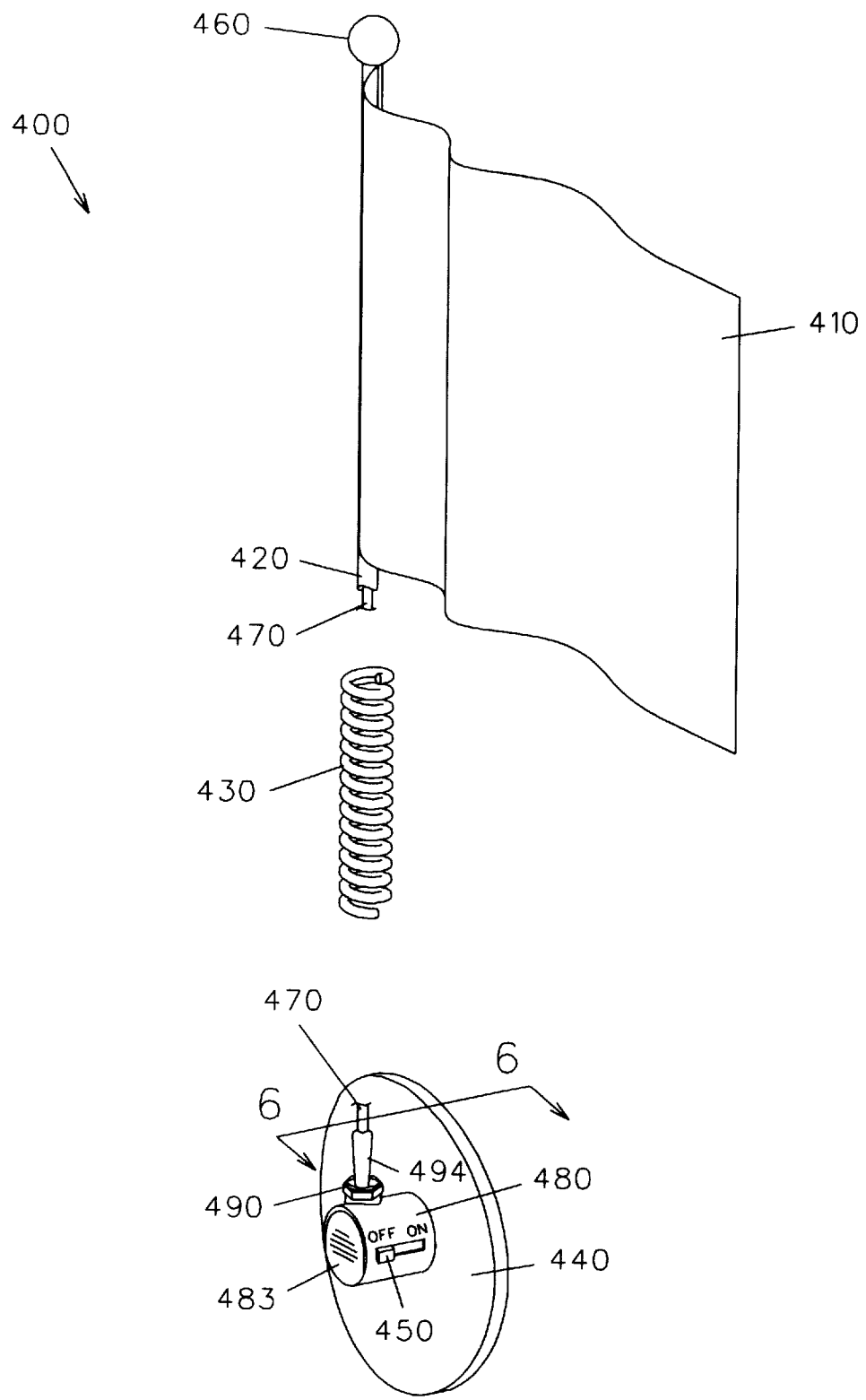
FIG. 5 is an exploded view of the signaling assembly on an enlarged scale with portions of the flagpole and wire being removed.

The ice fishing rig 100 further includes a signaling assembly 400. As best shown in FIGS. 1 and 5, the signaling assembly 400 includes a flag 410 attached to a flexible tubular flagpole 420 substantially adjacent a free end thereof. An opposed end of the flagpole 420 extends through the interior bore of a spring 430, the flagpole and spring being coupled to a switch housing 480. The signaling assembly 400 is normally in a position in which the flag 410 extends in a generally upward direction, the flagpole 420 is unflexed, and the spring 430 is unbiased (FIG. 1). However, the signaling assembly 400 can also be manually placed in a position in which the flag 410 is generally below the closed end 140 of the housing 110, the flagpole 420 is flexed, and the spring 430 is biased (FIG. 2), as to be more fully described below.

Figure 6:
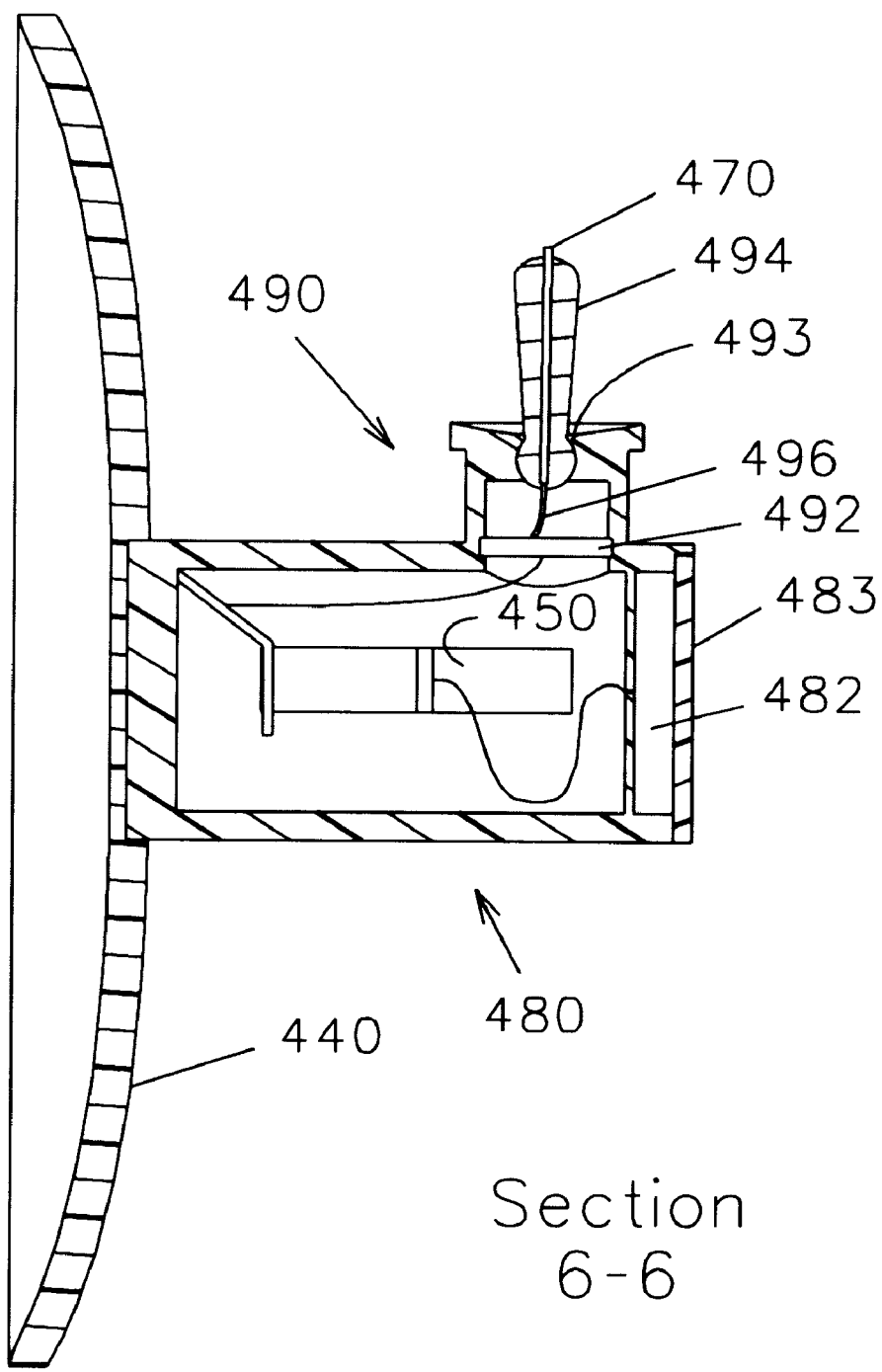
FIG. 6 is a sectional view of the switch housing taken along line 6—6 of FIG. 5 on an enlarged scale.

As shown in FIGS. 5 and 6, the switch housing 480 includes a battery 482 which may be replaced by removing an access panel 483 that is slidably mounted to the switch housing 480. The switch housing 480 further includes a power switch 450 and a toggle switch 490. The power switch 450 is movable by a user between an on and off position for selectively delivering power from the battery 482 to a plate 492 within the toggle switch 490. No current is delivered to the toggle switch 490 unless the power switch 450 is in an on position. Thus, a user may completely turn off the signaling device when the apparatus is not in use.

The toggle switch 490 includes a switch arm 494 positioned in a seat 493 in the switch housing 480, arm 494 extends through spring 430 and into the flagpole 420. A wire 470 extends between the light 460 and a lead 496. In the flagpole's normally upright position, the fully seated arm 496 urges lead 496 into contact with the plate 492 to transfer current to the wire 470 for energizing the light 460. The toggle switch 490 is switched to an open or deactivated position as the spring 430 and flagpole 420 are flexed to the downwardly extending configuration (FIG. 2) as the arm 494 is urged from seat 493 to displace lead 496 from plate 492. Thus upon the spring 430 and flagpole 420 returning to the upright configuration, the toggle switch 490 is switched to a closed position (FIG. 1). The bias of the spring 430 urges the flexed flagpole 420 towards its seated closed position so as to move the switch arm 494 of the toggle switch 490 to its normally open or activated position. It is understood that a mercury switch could be used in a similar manner as the toggle switch 490. If the power switch 450 is on and the toggle switch 490 is in a closed or activated state, current is passed through the wire 470 to energize the light 460. If the power switch 450 is in an off position, no current can be delivered to the light 460.

The switch housing 480 is fixedly attached to a suction cup 440 for releasably attaching the signaling assembly 400 to a desired position on the side wall 120 of the housing 110. Alternatively, the signaling assembly 400 could be fixedly attached to the side wall 120 with fasteners such as a bolt/nut combination or the like.

In use, the ice fishing rig 100 can be positioned over an ice hole to inhibit freezing of the water within the hole. The handle 230 can be rotated by a user for unwinding the fishing line 340 for extending the hook 350 to a desired depth. The flagpole 420 and spring 430 are then bent to a flexed position as in FIG. 2 such the flagpole bears against the first arm 240 of the handle 230. The toggle switch 490 of the signaling device 400 is thereby open such that current is not delivered to the light 460. When a fish is hooked, the spool 300, shaft 200, and handle 230 are rotated, thus releasing the flagpole 420 to springably return to a vertical position. This return of the flagpole 420 to its upright FIG. 1 position, as further aided by the bias of the spring 430, moves the toggle switch 490 to a closed position such that current is delivered to the light 460. The now upwardly disposed light 460 alerts the fisherman that a fish has been caught.

Accordingly, it can be seen that the tip-up ice fishing rig 100 provides an selectively illuminated signaling assembly that allows a fisherman to monitor the rig from a distance during the early morning or dusk hours.

It is understood that while certain forms of this invention have been illustrated and described, it is not limited thereto except insofar as such limitations are included in the following claims and allowable functional equivalents thereof.

What is claimed is:

1. A fishing apparatus comprising:
   a housing having an open end adapted to fit over a fish area;
   a shaft extending through said housing;
   a fishing line wound about said shaft, said line having a free end with hook thereon for extension through said housing open end, said hook adapted to catch a fish in the fish area thereon;
   a flag assembly on said housing, said flag assembly comprising:
      a spring presenting an interior bore;
      a flexible flag shaft having first and second ends, said first end of said flag shaft extending through said interior bore;
      a suction cup at said first end of said flag shaft, said suction cup adapted for releasably attaching said flag assembly to a desired position on said housing;
      a flag at said second end of said flag shaft, said flag shaft having a first unflexed position with said flag extending in a generally upward direction and a second flexed position in which said flag is generally below a top of said housing, a movement of said flag shaft from said first position to said second position causing a bias in said spring urging said flag shaft to said first position;

a light attached to said second end of said flag shaft;

a switch housing coupled to said first end of said flag shaft;

a power supply disposed within said switch housing, said power supply providing an electric current for energizing said light;

an electric circuit including said power supply and said light;

a switch means mounted on said suction cup, said switch means including a lead wire extending from said first end of said flag shaft;

said spring coupled to said switch means for mounting said first end of said flag shaft to said switch means;

a seat in said switch housing for said first end of said flag shaft, said flag shaft at said first position urging said first end of said flag shaft into said seat and said lead wire into said circuit to cause a current flow therethrough for current delivery to said light, said flag shaft at said second position displacing said first end of said flag shaft from said seat and said lead wire from said circuit for precluding a current flow therethrough to said light; and a handle on said shaft, said handle operating to rotate said shaft in a direction to unwind said fishing line with hook thereon for extension through said housing open end and into the fish area, said handle upon said extension bearing against said flag shaft in said second flexed position to maintain said flag shaft with said flag thereon in a position below a top of said housing and to maintain said bias of said spring, a catch of a fish on said hook causing a subsequent movement of said handle away from said flexed flag shaft to allow said flag shaft to move to said first unflexed position and to release said bias of said spring, whereby to position said flag at said first position indicative of a fish on said fishing line.

2. The apparatus as claimed in claim 1 further comprising a power switch in said circuit for manually opening or closing said circuit.

3. The apparatus as in claim 1 wherein said power supply is a battery.

* * * * *